UNITED STATES PATENT OFFICE.

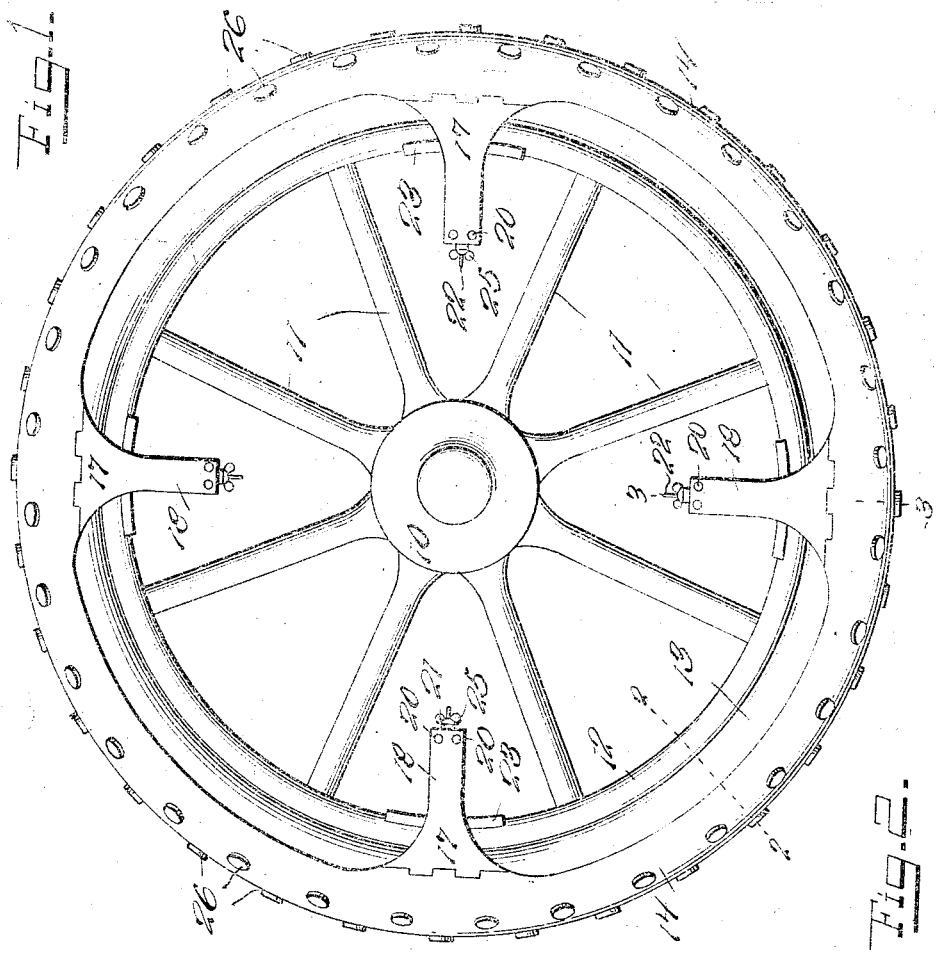
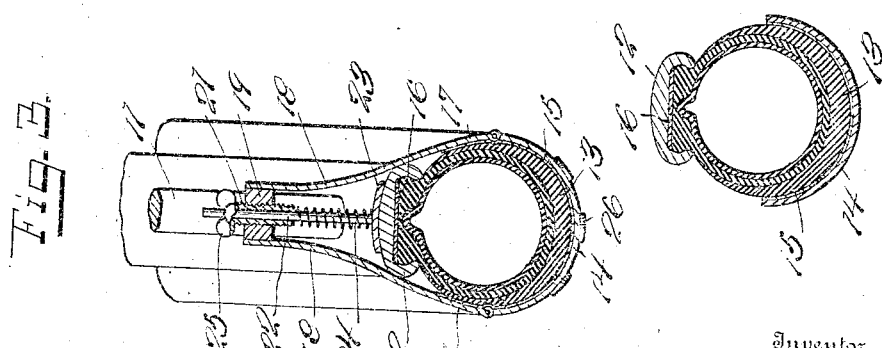

HORACE G. WHEELER, OF CANANDAIGUA, NEW YORK.

TIRE-ARMOR.

No. 891,578.

Specification of Letters Patent.

Patented June 23, 1908.

Application filed October 30, 1906. Serial No. 341,213.

*To all whom it may concern:*

Be it known that I, HORACE G. WHEELER, a citizen of the United States, residing at Canandaigua, in the county of Ontario, State of New York, have invented certain new and useful Improvements in Tire-Armors; and I do hereby declare the following to be a full, clear, and exact description of the invention, such as will enable others skilled in the art to which it appertains to make and use the same.

This invention has as its object the provision of armoring means for the tread of pneumatic and other cushion tires to protect the same against puncture and other severe damage, and against too rapid wear and disintegration.

It is also the object of the invention to provide an armor for tires of the kind mentioned that can be readily applied and removed, and when in place on the tire, whether on an outer or inner tire, to be securely held, and yet without undue rigidity and without chafing the tire.

Incidentally, it is proposed to construct the armor (when on the outer tire) in such manner as to prevent the tire from slipping or skidding.

The nature of the invention may be ascertained from the devices portrayed in the annexed drawings, forming a part of this specification, in view of which, the invention will first be described with respect to its construction and mode of use, and then be pointed out in the subjoined claims.

Of the said drawings—Figure 1 is a side elevation of my improvement connected with an automobile wheel. Fig. 2 is a transverse section through the tire and rim of the wheel in the plane 2—2 of Fig. 1. Fig. 3 is a transverse section in the plane 3—3 of Fig. 1.

Similar numerals of reference designate similar parts or features, as the case may be, wherever they occur.

In the drawings, 10 designates the hub of a wheel, 11 are the spokes; 12, the rim which may be of channel or other suitable form; and, 13, the pneumatic or cushion tire. The tire 13 may be carried by a wheel of different construction from that shown and described so long as the improvements to be presently described are applicable thereto.

14 designates the armor or protection consisting of a thin shell of metal, in the form of the segment of a circle in cross section, and made to constitute a circular band adapted to fit snugly on the tread of the tire and to tend inward on the sides so as to cover nearly or quite one-half of the same.

A sheet of rubber, 15, or other material to obviate chafing of the tire by the armor rim 14, is interposed between the latter and the tire; and a strip, 16, of similar material for a like purpose may be interposed between the rim 12 of the wheel and the tire.

17 designates plates hingedly connected with the inner edge of the armor rim 14 and conforming to the edge of the same, the said plates having tongues 18 extending radially inward from the said inner edge of the armor rim, so that their reduced ends may be brought upon the opposite sides of a block 19 and secured thereto by bolts or screws 20 passed through perforations in the ends of the tongues, said block having a threaded opening formed therethrough. Slidably fitted in the opening of the block 19 is an exteriorly threaded sleeve, 21, through which there extends a rod, 22, having a curved shoe or shield, 23, bearing against the inner face of the rim, between which shoe and the inner end of the ferrule 21 there is a helical spring, 24, coiled about the rod 22. A thumb-screw, 25, is secured to the outer end of the threaded sleeve and is provided with an axial opening through which said rod extends, rotation of the thumb screw having the effect therefore of drawing the armor rim on the tire snugly in place, and of pressing the rim of the wheel against the tire.

The means described not only armor the tire and protect it against damage, but they hold the armor on the tire yieldingly to a slight degree so as to take up vibrations and shocks, and provide for the ready detachment of the same. Should the armor rim become loose on the tire it may be tightened thereon by simply turning down the thumb-screws 25.

It is proposed to form protuberances 26 on the armor rim by pressing outward parts of the material constituting the armor shell so as to cause the tire to take secure hold on the ground to prevent slipping and skidding laterally.

The hinging of the plates and their extended ears or tongues to the inner edge of the armor shell permits of their ready accommodation to the movements of the tire and the vibrations and jars of the wheel.

What is claimed is—

An armor for rubber tires comprising an annular shell having a series of pairs of oppositely-disposed plates hinged to its side edges, each plate being provided with a tongue extending radially inwards therefrom, a block secured between the free ends of each pair of tongues and provided with a threaded opening, a threaded sleeve slidable in said opening, a rod slidable through said sleeve and projecting therebeyond at opposite ends, a thumb-screw secured to the outer end of said sleeve and provided with an axial opening through which said rod passes, a shoe secured to the inner end of the rod, and a coil-spring carried by the rod and bearing against said shoe and the adjacent end of said sleeve.

In testimony whereof, I affix my signature, in presence of two witnesses.

HORACE G. WHEELER.

Witnesses:
PETER P. TURNER,
EDWARD G. HAYES.